United States Patent
Takasu

(10) Patent No.: US 8,374,107 B2
(45) Date of Patent: Feb. 12, 2013

(54) COMMUNICATION APPARATUS AND TRANSMISSION LINE COMMUNICATION CHIP FOR ADJUSTING TRANSMISSION TIMING

(75) Inventor: Shigeru Takasu, Tokyo (JP)

(73) Assignee: Sony Corporation (JP)

( * ) Notice: Subject to any disclaimer, the term of this patent is extended or adjusted under 35 U.S.C. 154(b) by 665 days.

(21) Appl. No.: 12/462,426

(22) Filed: Aug. 4, 2009

(65) Prior Publication Data

US 2010/0034297 A1    Feb. 11, 2010

(30) Foreign Application Priority Data

Aug. 7, 2008  (JP) .............................. P2008-204741

(51) Int. Cl.
*H04B 3/00* (2006.01)
*H04B 1/44* (2006.01)
*H04M 1/24* (2006.01)
(52) U.S. Cl. .................. 370/282; 375/257; 379/1.03
(58) Field of Classification Search .................. 370/282; 375/257; 379/1.03
See application file for complete search history.

(56) References Cited

U.S. PATENT DOCUMENTS 7,286,495 B2 * 10/2007 Hasegawa et al. ............ 370/282
2010/0034297 A1 * 2/2010 Takasu .......................... 375/257

FOREIGN PATENT DOCUMENTS

| JP | 2007-019662 A | 1/2007 |
| JP | 2007019618 A | 1/2007 |
| JP | 2007135180 A | 5/2007 |
| JP | 2008054015 A | 3/2008 |

* cited by examiner

*Primary Examiner* — William D Cumming

(74) *Attorney, Agent, or Firm* — Lerner, David, Littenberg, Krumholz & Mentlik, LLP

(57) ABSTRACT

A communication apparatus which may include a power supply that acquires a supply voltage from a power line connected from outside, a transmission control unit that transmits a pilot signal and signals subsequent to the pilot signal to the power line, a pilot signal detection unit that detects pilot signals transmitted to the power line by other apparatuses, and a timing adjustment unit that adjusts transmission timing of the pilot signal of the communication apparatus in accordance with that of the pilot signals transmitted by the other apparatuses.

6 Claims, 14 Drawing Sheets

TIME

TIME

THIRD APPARATUS
OUTPUTS IN THE MIDDLE
OF TWO SIGNALS

COMMUNICATION APPARATUS AND TRANSMISSION LINE COMMUNICATION CHIP FOR ADJUSTING TRANSMISSION TIMING

CROSS-REFERENCE TO RELATED APPLICATION

The present application claims priority from Japanese Patent Application No. JP 2008-204741 filed in the Japanese Patent Office on Aug. 7, 2008, the entire content of which is incorporated herein by reference.

BACKGROUND OF THE INVENTION

1. Field of the Invention

The present invention relates to a communication apparatus, a transmission line communication chip, and a communication method.

2. Description of the Related Art

Nowadays, power line communication (PLC) that performs communication using a power line is known. In the PLC, if different communication methods exist and apparatuses of a plurality of communication methods are used simultaneously without synchronization, each of such apparatuses serves as an interference source for other apparatuses. Thus, it is necessary to change the plurality of methods depending on time division, but apparatuses using power lines do not communicate with each other and thus, time division information is transmitted/received by detecting presence of carriers of signals of other apparatuses and connecting simple 1-bit signals. Since it is necessary to output the 1-bit signal after being synchronized by each method, a technique to synchronize signals according to predetermined reference timing is used. In the case of PLC, for example, a definite reference called a zero-cross point of AC power supply is known and signals are synchronized with reference to the zero-cross point.

Japanese Patent Application Laid-Open No. 2007-19662

SUMMARY OF THE INVENTION

However, if the zero-cross point of AC power supply is used as the reference, an error occurs in detection of the zero-cross point due to influences of circuit characteristics, distortion of waveforms, and noise. Thus, in order to keep signals of different apparatuses from overlapping, it is necessary to arrange signals with an interval of double the maximum error by assuming that the maximum error occurs for each signal of each apparatus. In this case, because the interval between signals is wide, transmission efficiency is degraded.

This issue will be discussed in detail below based on FIG. 13 to FIG. 15. FIG. 13 is a schematic diagram showing how a transmission signal is transmitted based on zero-cross points of an AC power supply in two apparatuses of Apparatus A and Apparatus B. As shown in FIG. 13, each of Apparatus A and Apparatus B sequentially transmits a first signal (bit1), a second signal (bit2), . . . after a predetermined offset time from a detection point of zero cross.

FIG. 13 shows a case in which timing of the zero-cross detection point of Apparatus A and that of the zero-cross detection point of Apparatus B are different. Since an error of zero-cross detection due to influences of circuit characteristics, distortion of waveforms, or noise occurs, as described above, timing of the zero-cross detection point is different between Apparatus A and Apparatus B. In this case, as shown in FIG. 13, an issue that a second signal of Apparatus A and a first signal of Apparatus B overlap arises.

Thus, as shown in FIG. 14, a technique to provide an interval between signals by forming a slot of a fixed time as a margin including an assumed of zero-cross detection error in each apparatus is used. By providing an interval between signals of each apparatus by an expected zero-cross detection error, as shown in FIG. 14, overlapping of signals of the other apparatus can be suppressed. However, according to this technique, each bit contains a margin for a detection error under the assumption that an error arises in detection of a reference signal and thus, the number of signals that can be transmitted in a certain period of time decreases, posing an issue of degraded transmission efficiency.

FIG. 15 is a schematic diagram showing intervals of signals in consideration of the margin. If a detection error of a zero-cross point used to achieve synchronization is ±Eref, signals of Apparatus A and Apparatus B may be in a spatial relationship having a shift of 2Eref to each other when those of Apparatus A and Apparatus B are shifted maximally. Therefore, if the first output signal of each apparatus should be output after the defined offset time, as shown in FIG. 15, the position will be shifted by 2×Eref.

Here, since it is difficult for each of Apparatus A and Apparatus B to recognize the magnitude of an error of the own apparatus with respect to the reference timing, it is necessary to consider the possibility that a signal of the other apparatus is present at a position ±2Eref away from a signal of the own apparatus. Similarly, it is also necessary for the other apparatus to consider the possibility that a bit signal of the other apparatus is present at a position ±2Eref away from a signal of the own apparatus. Therefore, it is difficult for each apparatus to place the next bit signal within ±2Eref of a signal transmitted by each apparatus.

Thus, it is necessary for each apparatus to transmit the second signal of each apparatus with an interval of at least 4Eref after the first signal of each apparatus to prevent the first signal transmitted by the other apparatus from overlapping with the second signal transmitted by each apparatus. Similarly, it is necessary to output the third signal with an interval of at least 4Eref after the second signal.

In a system in related art as described above, there is a need for providing a wide interval between signals arising from a detection error of reference timing, thus causing an issue of degraded transmission efficiency.

The present invention has been made in view of the above issues and it is desirable to provide a novel and improved communication apparatus capable of suppressing interference with signals transmitted by other apparatuses and improving transmission efficiency in transmission line communication, a transmission line communication chip, and a communication method.

According to an embodiment of the present invention, there is provided a communication apparatus, including: a power supply unit that acquires a voltage from a transmission line connected from outside; a transmission control unit that transmits a data signal and a pilot signal placed at a start of the data signal to the transmission line; a pilot signal detection unit that detects pilot signals transmitted to the transmission line by other apparatuses; and a timing adjustment unit that adjusts transmission timing of the pilot signal of the communication apparatus in accordance with transmission timing of the pilot signals transmitted by the other apparatuses.

The pilot signal detection unit may detect the pilot signal within predetermined time limits using the transmission timing of the pilot signal transmitted by the transmission control unit as a reference.

If the pilot signal detection unit detects only the pilot signal transmitted by the one other apparatus, the timing adjustment unit may fit the transmission timing of the pilot signal of the communication apparatus to the transmission timing of the detected pilot signal.

If the pilot signal detection unit detects the pilot signal during communication, the timing adjustment unit may move the transmission timing of the pilot signal of the communication apparatus toward the transmission timing of the detected pilot signal.

If the pilot signal detection unit detects the pilot signals transmitted by a plurality of the other apparatuses, the timing adjustment unit may output the pilot signal of the communication apparatus toward a center of variations of the transmission timing of a plurality of the detected pilot signals.

If the pilot signal detection unit detects the plurality of pilot signals when newly starting communication, the timing adjustment unit may output the pilot signal of the communication apparatus toward the center of variations of the transmission timing of the plurality of the detected pilot signals.

If the pilot signal detection unit detects the plurality of pilot signals during communication, the timing adjustment unit may move the transmission timing of the pilot signal of the communication apparatus toward the center of overall variations including the transmission timing of the plurality of detected pilot signals and the transmission timing of the pilot signal of the communication apparatus.

The communication apparatus may include a reference timing signal generation unit that generates a reference timing signal from a zero-cross point of the voltage acquired from the transmission line, and the transmission timing of the pilot signal may be set based on the reference timing signal.

The communication apparatus may include a convergence determination unit that determines whether the transmission timing of the pilot signal of the communication apparatus and the transmission timing of the pilot signals transmitted by the other apparatuses converge to a predetermined range, and if the convergence determination unit determines that the transmission timing of the pilot signals of the communication apparatus and the other apparatuses converge to the predetermined range, the timing adjustment unit may stop adjusting the transmission timing of the pilot signals.

A predetermined time interval may be provided between the pilot signal and the data signal subsequent to the pilot signal.

The transmission control unit may transmit the pilot signal and signals subsequent thereto as an OFDM signal and the pilot signal and the signals subsequent to the pilot signal may have different phase vectors.

According to another embodiment of the present invention, there is provided a transmission line communication chip, including: a transmission control unit that transmits a pilot signal and signals subsequent to the pilot signal to a transmission line; a pilot signal detection unit that detects pilot signals transmitted to the transmission line by other apparatuses; and a timing adjustment unit that adjusts transmission timing of the pilot signal of its own apparatus in accordance with transmission timing of the pilot signals of the other apparatuses.

According to another embodiment of the present invention, there is provided a communication method including the steps of: detecting pilot signals transmitted to a transmission line by other apparatuses; acquiring a center of variations of transmission timing of the pilot signals; and setting the transmission timing of the pilot signal of its own apparatus so that the transmission timing moves toward the center of the acquired variations and outputting the pilot signal of its own apparatus to the transmission line.

According to the present invention, it becomes possible to suppress interference with signals transmitted by other apparatuses and also to improve transmission efficiency in transmission line communication.

DETAILED DESCRIPTION OF THE PREFERRED EMBODIMENTS

Figure 1:
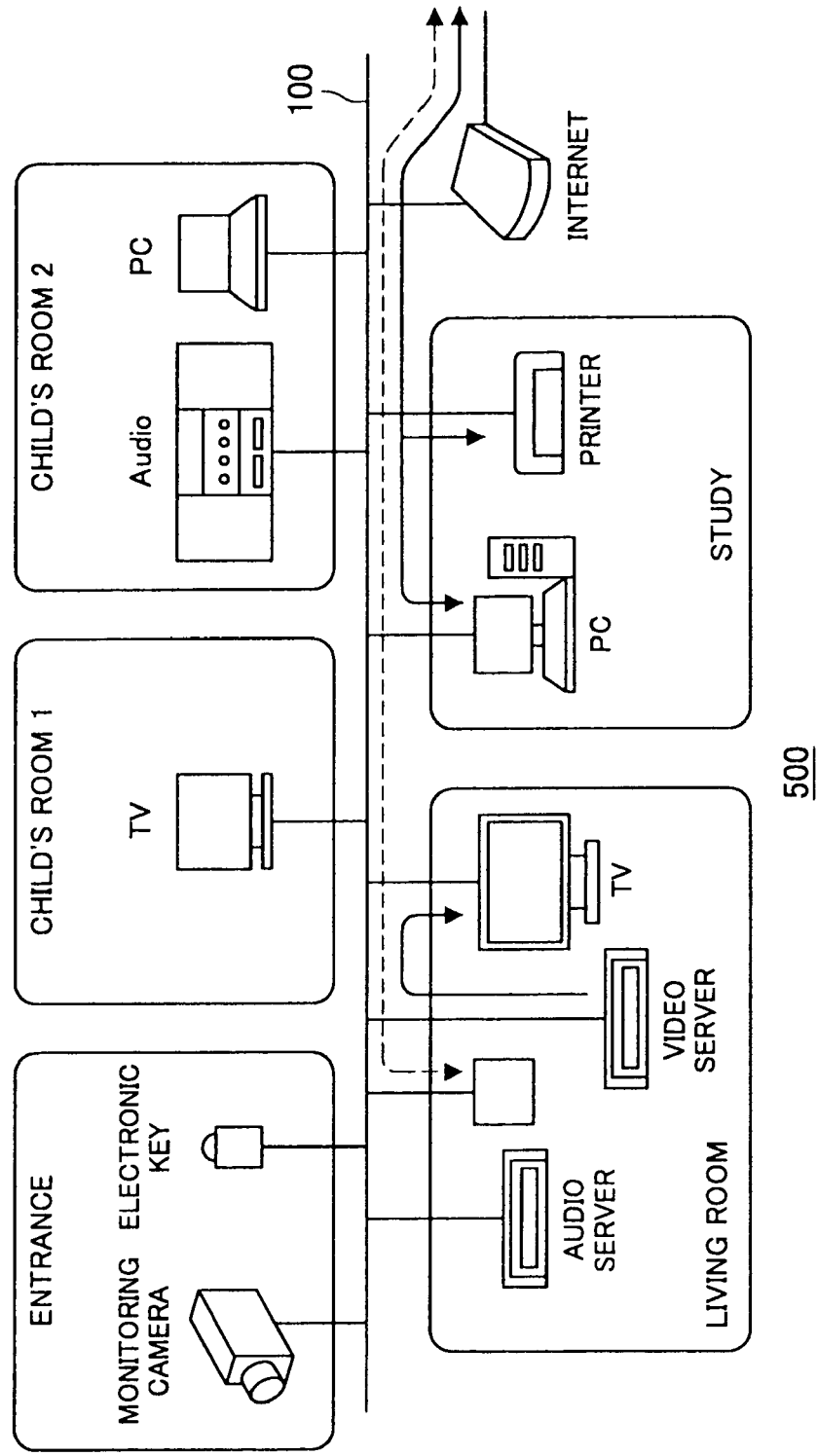
FIG. 1 is a schematic diagram showing a configuration of a power line communication system installed in a home.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

In a power line communication system 500 according to the present embodiment, a plurality of communication apparatuses is connected to a power line 100 and a modem 200 provided with each communication apparatus is connected to the power line 100. Then, transmission intervals of the modem 200 are set by time division in order to avoid a collision of transmission signals by the different modems 200 on the power line 100. To set transmission intervals based on time division, each of the modems 200 has a reference timing generation unit 218 to generate reference timing to perform time division processing based on a commercial supply voltage and transmission intervals are set in a period before and after the reference timing.

System Configuration

First, the configuration of the power line communication system 500 according to an embodiment of the present invention will be described. FIG. 1 is a schematic diagram showing the configuration of the power line communication system 500 installed in a home. As shown in FIG. 1, the power line 100 is wired in the home and various communication apparatuses installed in an entrance, child's rooms 1/2, a living room, a study and the like are connected to each of the power lines 100. Communication apparatuses are equipment including, as shown in FIG. 1, a monitoring camera, electronic key, TV receiver (TV), audio equipment (Audio), personal computer (PC), audio server, video server, and printer. Each communication apparatus has the modem 200. The power line 100 is connected to the modem 200 provided with each communication apparatus. The power line 100 to which a commercial supply voltage is supplied is exemplified in the present embodiment, the present embodiment described below is not limited to this. In addition to the power line 100, the present embodiment can widely be applied to transmission lines such as a telephone line and coaxial cable and in such cases, like in the power line 100, signals can be synchronized.

Configuration of the Modem

Figure 2:
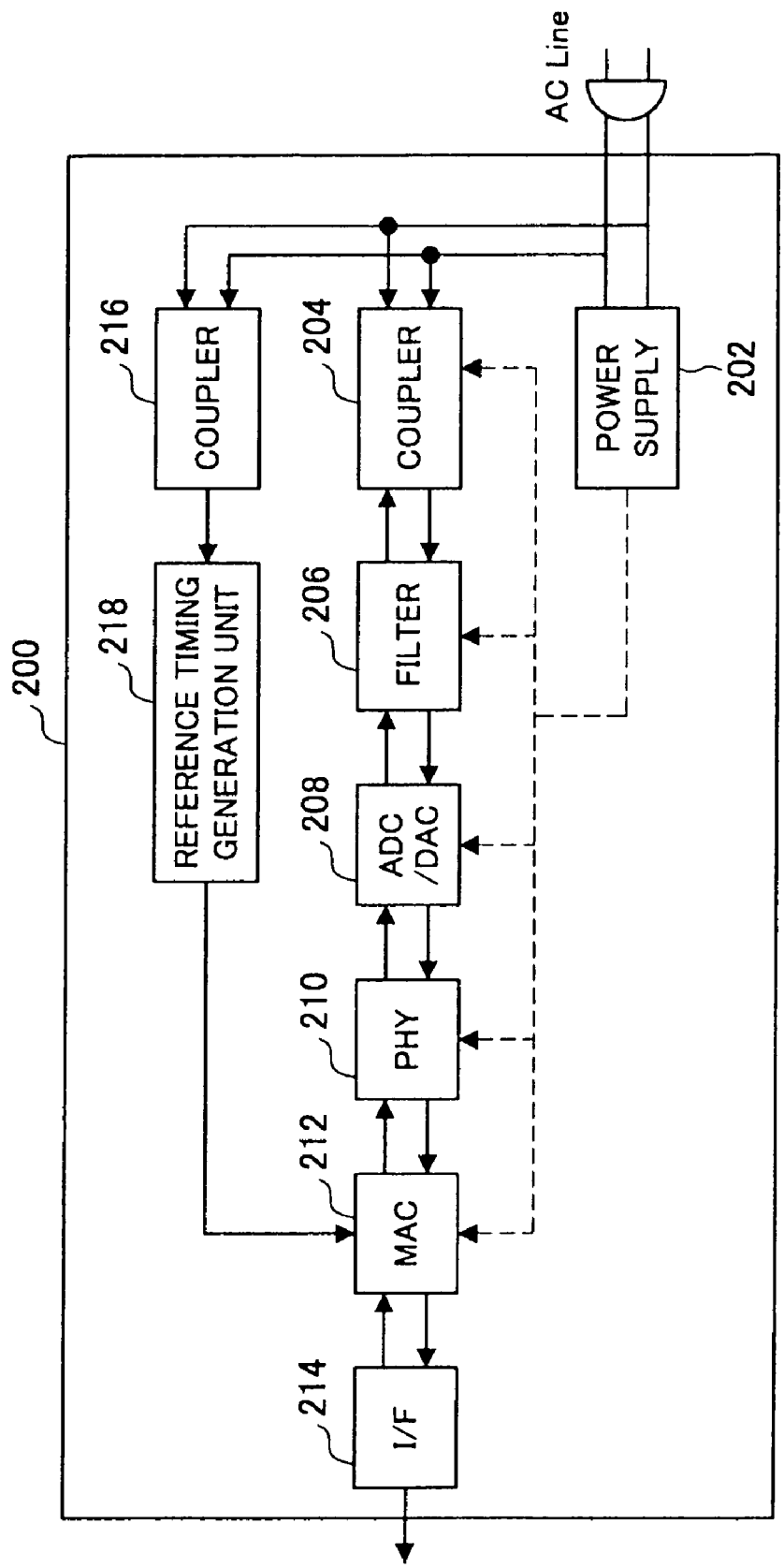
FIG. 2 is a block diagram showing the configuration of a modem.
Figure 3:
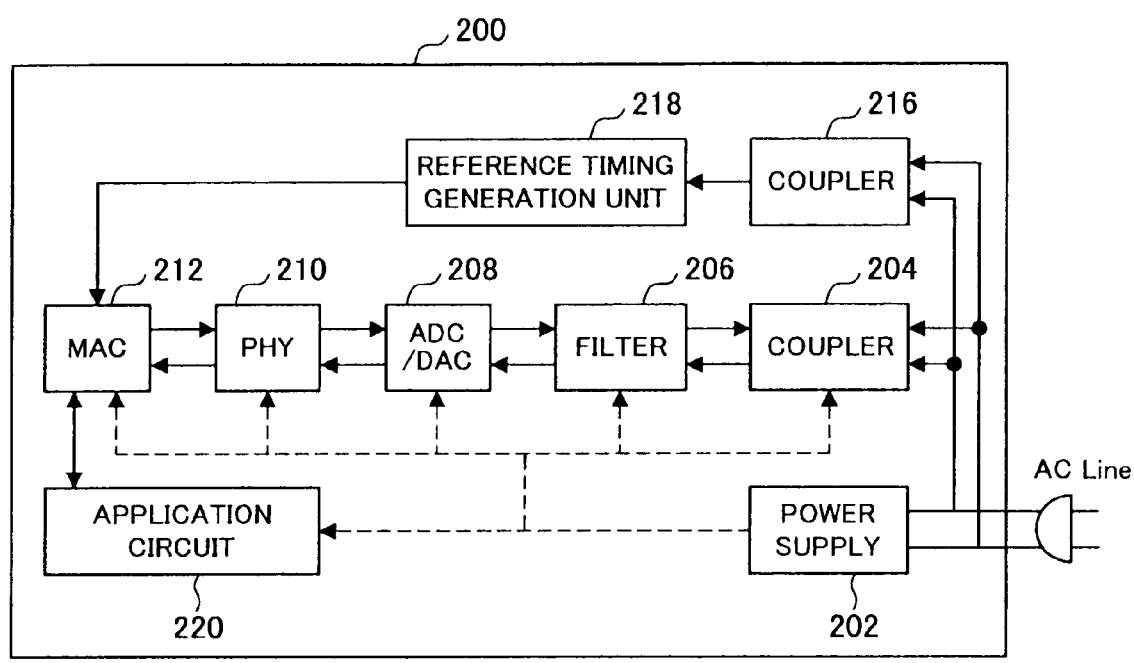
FIG. 3 is a block diagram showing the configuration of the modem.

Next, the configuration of the modem 200 provided with each communication apparatus will be described. FIG. 2 and FIG. 3 are block diagrams showing the configuration of the modem 200. Here, FIG. 2 shows the modem 200 of standalone PLC modem type and FIG. 3 shows the modem 200 of built-in PLC modem type.

The modem 200 shown in FIG. 2 includes a power supply 202, a coupler 204, a filter 206, a converter 208 that performs AD conversion or DA conversion, a PHY layer transmission processing unit (PHY) 210, a MAC (Media Access Control) layer processing unit (MAC) 212, an interface 214, a coupler 216, and a reference timing generation unit 218. The modem 200 shown in FIG. 3 includes the power supply 202, the coupler 204, the filter 206, the converter 208, the PHY 210, the MAC 212, the coupler 216, the reference timing generation unit 218, and an application circuit 220. FIG. 2 and FIG. 3 show the filter 206, the converter 208, and the PHY 210 in common on the transmitting and receiving sides, but these components may be provided separately on the transmitting and receiving sides. The MAC 212 and adjacent components thereof may be configured as an integral chip.

In FIG. 2, transmission data received from a higher layer is input into the MAC 212 via the interface 214 and then into the coupler 204 via the PHY 210, the converter 208 that performs DA conversion, and the filter 206. The transmission signal is output to the power line 100 via the coupler 204.

On the other hand, a commercial supply voltage is removed from a signal received via the coupler 204 by the coupler 204 and an extracted high-frequency signal is input into the MAC 212 via the filter 206, the converter 208 that performs AD conversion, and the PHY 210. Then, correctly received data is output to the higher layer from interface 214.

A supply voltage extracted from the power line 100 is input into the power supply 202. The power supply 202 supplies power to be a source of power to operate communication apparatuses, that is, power to be a source of power of each component shown in FIG. 2.

The modem 200 shown in FIG. 3 receives transmission data from the application circuit 220 and outputs the transmission data to the power line 100. The received data is also output to the application circuit 220. Otherwise, the configuration is the same as that of the modem 200 shown in FIG. 2.

The coupler 216 contains a filter to extract a commercial supply voltage from a signal on the power line 100. Since the power line communication system 500 performs communication by superimposing a signal on a commercial supply voltage, the coupler 216 removes the signal to extract the commercial supply voltage.

The reference timing generation unit 218 generates a reference timing signal TGref by providing reference timing in synchronization with the period of AC commercial supply voltage extracted by the coupler 216 and provides the reference timing signal TGref to the MAC 212. More specifically, the reference timing generation unit 218 detects points (zero-cross points) where the voltage is 0 by using the AC period of the commercial supply voltage and generates a reference timing signal in synchronization with zero-cross timing of the commercial supply voltage. The reference timing signal is a common timing signal generated by the modem 200 provided with all communication apparatuses in the power line communication system 500.

In the modem 200, the MAC 212 controls transmission timing based on the reference timing generated by the reference timing generation unit 218. The MAC 212 calculates timing to transmit data based on the reference timing signal TGref and transmission interval data SP and controls a transmission signal so that the data is transmitted in the timing.

Figure 4:
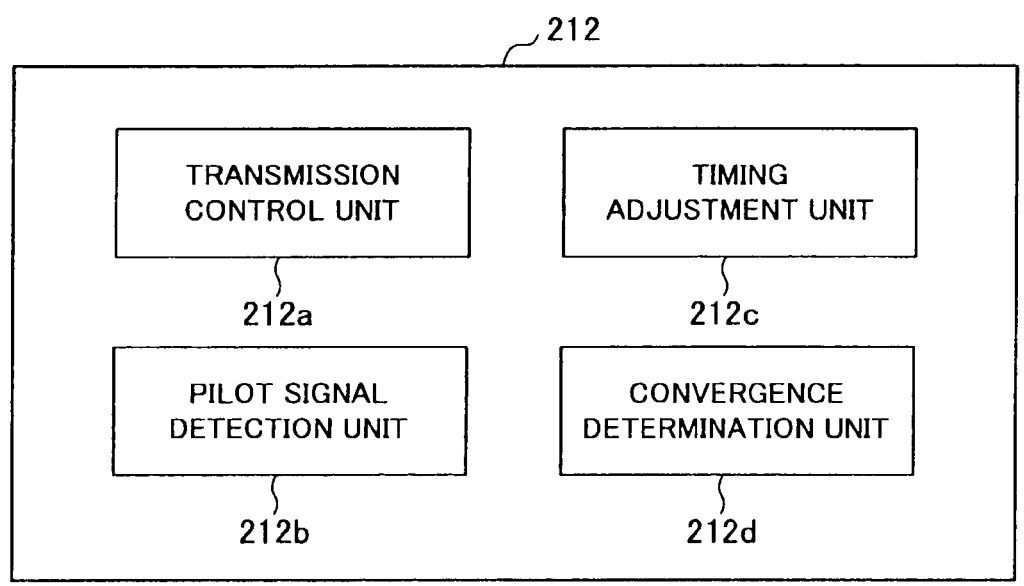
FIG. 4 is a block diagram showing the function configuration of MAC.

FIG. 4 is a functional block diagram showing the configuration of the MAC 212. The MAC 212 includes a transmission control unit 212a, a pilot signal detection unit 212b, a timing adjustment unit 212c, and a convergence determination unit 212d. The transmission control unit 212a transmits a pilot signal (first signal) and data signals (second and subsequent signals) subsequent to the pilot signal to the power line 100 by adjusting the interval therebetween. The pilot signal detection unit 212b detects pilot signals transmitted to the power line 100 by other apparatuses. The timing adjustment unit 212c adjusts transmission timing of a pilot signal of its own apparatus (the own apparatus) in accordance with that of pilot signals transmitted by other apparatuses. The convergence determination unit 212d determines whether pilot signals of the own apparatus and other apparatuses have converged within the range of predetermined time. The functional block of the MAC 212 shown in FIG. 4 may be configured by hardware (circuits) or an arithmetic processing unit and software (programs) to cause the arithmetic processing unit to function.

The configurations of the modem 200 shown in FIG. 2 and FIG. 3 may be made different configurations. Generally, a transmitting/receiving circuit in a modem is implemented as one chip, but for example, the coupler 216 and the reference timing generation unit 218 may be external circuits connected to the modem 200.

Processing in the Present Embodiment

In a system in related art, as described above, it is necessary to widen the interval between signals arising from a detection error of a reference timing signal. In order to improve transmission efficiency of a signal, on the other hand, it is necessary to minimize the margin between signals. Here, the width of signals and the interval therebetween can be determined correctly based on the clock of an internal circuit in one apparatus and thus, an error of position between signals is very small. Therefore, if no detection error Eref of the reference timing signal arises, signals of each bit can be packed without gaps, leading to improved transmission efficiency.

Thus, a system in the present embodiment detects positions of signals of other apparatuses and exercises control in such a way that signals of the own apparatus are fitted to positions of signals of other apparatuses. Even if a signal of the own apparatus is shifted with respect to a zero-cross point, a correction can be made by detecting signal positions of other apparatuses and fitting the signal of the own apparatus to the signal positions of other apparatuses. Processing performed in the present embodiment will be described in detail below.

Figure 5:
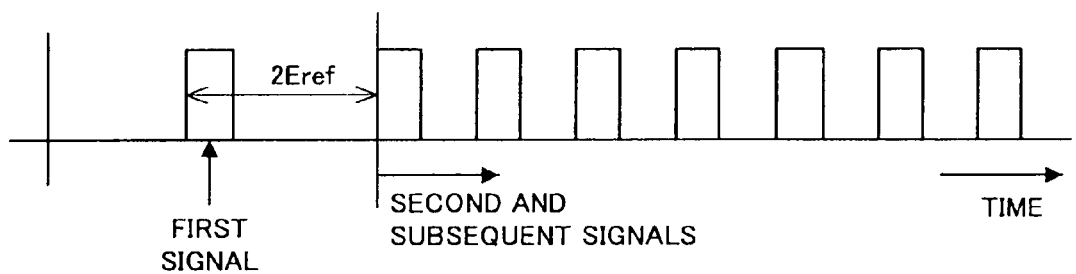
FIG. 5 is a schematic diagram of signals transmitted by each apparatus.

In the present embodiment, FIG. 5 is a schematic diagram of signals transmitted by each apparatus. As shown in FIG. 5, the first signal is first transmitted as a pilot signal. The pilot signal is a signal showing the presence of the communicating own apparatus and is arranged at the head of a data signal. Then, after the first signal, the second and subsequent signals are transmitted as data signals. The pilot signal is a signal transmitted when a predetermined offset time passes after the reference timing signal. The second and subsequent signals are signals transmitted using the first signal as the reference. Transmission timing of the second and subsequent signals is decided by the MAC 212.

Thus, a system in the present embodiment outputs data signals that are common carrier signals by providing predetermined timing after the pilot signal serving as the reference and receives carrier signals of the predetermined timing after the pilot signal. Accordingly, apparatuses using different communication methods can exchange information based on presence/absence of carriers or a difference of phase vectors.

As described above, a shift of ±Eref of the pilot signal from the reference timing signal is expected. Thus, if an attempt is made to transmit the second and subsequent signals by considering the shift, it is necessary to provide a sufficient time interval between signals, leading to degraded transmission efficiency.

In the present embodiment, when a plurality of apparatuses transmits a signal to the transmission path, each apparatus detects a pilot signal (first signal) of the other apparatuses. Then, after the first signal of the other apparatuses being detected, timing of the first signal of the own apparatus is adjusted by fitting to the timing thereof. Here, the first signal of the other apparatus and that of the own apparatus may be matched from the start or transmission timing of the pilot signal of the own apparatus may gradually be adjusted so that transmission timing of the pilot signal of the own apparatus matches timing of the pilot signal of the other apparatus. By repeating adjustments in this manner, transmission timing of the pilot signal of each apparatus can be matched in the end. Each apparatus detects the pilot signal of the other apparatuses by considering a possibility of presence of a pilot signal of other apparatuses at positions ±2Eref away from the signal position of the own apparatus. However, the detection range of pilot signal is not limited to the above example.

If a second signal is detected when no first signal has been detected, there is a possibility of synchronization by recognizing the second signal as the first signal. Also when the second signal is output in timing near the first signal, there is a possibility of synchronization by recognizing the second signal as the first signal. Thus, in the present embodiment, it is assumed that the first signal is transmitted without fail and further, a time of predetermined period (2Eref) is provided between the first and second signals. Accordingly, whether a detected signal is a pilot signal can be recognized based on the interval to the next signal. Then, if the first signal of other apparatuses is detected, control is exercised so that the first signal of the own apparatus is fitted to the first signal of the other apparatuses.

If there is only one other apparatus that transmits signals to the power line 100, it is relatively easy to fit the position of the first signal of the own apparatus to that of a signal of the other apparatus. However, if a plurality of first signals transmitted from a plurality of other apparatuses is detected, when the first signal of the own apparatus is fitted to one of the first signals, it is difficult to fit the first signal of the own apparatus to the first signals of the other apparatuses.

Thus, in the present embodiment, each apparatus outputs a pilot signal according to rules below, assuming that each apparatus operates according to the same algorithm.

First, if the own apparatus has not started communication and will soon start communication, first signals of other apparatuses that are already outputting signals to the power line 100 are detected and the first signal of the own apparatus is output toward the center of the range of variations of the first signals of other apparatuses. Next, if a first signal of another apparatus deviating from the first signal of the own apparatus is detected after the first signal of the own apparatus being started to transmit, the position of the signal of the own apparatus is moved toward the center of the range of overall variations including the first signal of the other apparatus and that of the own apparatus.

Here, if each apparatus moves the first signal of the own apparatus to fit to the detected first signal of another apparatus, it is expected that positions of first signals of all apparatuses do not converge to one point while positions of first signals being mutually interchanged. According to the present embodiment, first signals of all apparatuses can be fitted to the same timing by moving the first signal of the own apparatus toward the center of the range of overall variations including first signals of other apparatuses and the first signal of the own apparatus so that an overall shift can be corrected.

Incidentally, movement of the pilot signal of the own apparatus toward the center of variations of pilot signals of other apparatuses in one adjustment need not necessarily be achieved and movement processing of the pilot signal of the own apparatus more to the center side may be performed within the range of overall variations of pilot signals. For example, each apparatus may move transmission timing of the pilot signal to the center side within the variation range of detected pilot signals by a value of about ⅓ to ¼ of the range. According to this method, while it takes relatively long time before the position of the pilot signal of each apparatus is caused to converge, the position of the pilot signal can be caused to converge in the end by performing processing to move the pilot signal a plurality of times.

Then, after transmission timing of pilot signals being matched, an error of transmission timing of each apparatus with respect to the reference timing signal is eliminated and thus, there is no need to provide a transmission interval in consideration of an error in transmission of the second signal and thereafter. Therefore, transmission efficiency of signals transmitted by each apparatus can be improved.

Figure 6A:
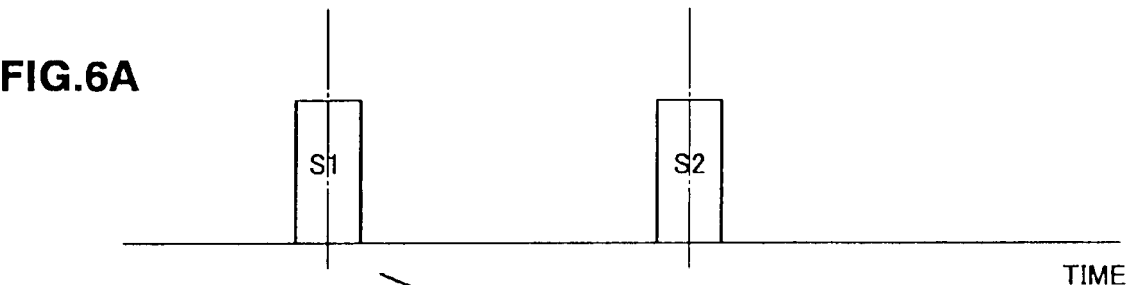
FIG. 6 is a schematic diagram when Apparatus B is already communicating before Apparatus A enters communication and outputs a pilot signal S2.
Figure 6B:
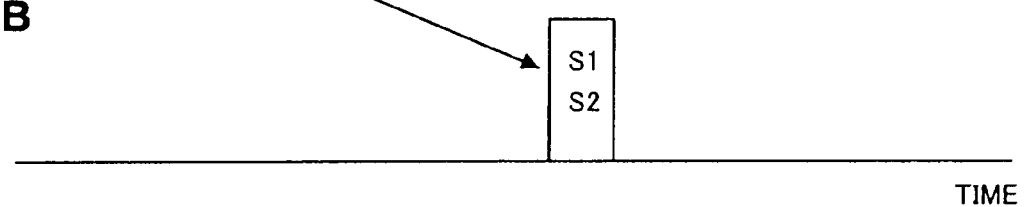

Concrete processing to cause the position of the pilot signal of each apparatus to match will be described based on drawings. First, a case in which transmission is newly started when other apparatuses are already communicating will be described. FIG. 6 shows a case in which Apparatus B is already communicating before Apparatus A enters communication and outputs the pilot signal S2. In this case, Apparatus A detects the position of the pilot signal S2 of Apparatus B. Then, if, as shown in FIG. 6A, the position where Apparatus A attempts to output the pilot signal S1 is shifted from that of the pilot signal S2 of Apparatus B, as shown in FIG. 6B, Apparatus A outputs the pilot signal S1 by fitting to the position of the pilot signal S2 of Apparatus B. With this operation, timing of the pilot signals of Apparatus A and Apparatus B can be matched.

Figure 7A:
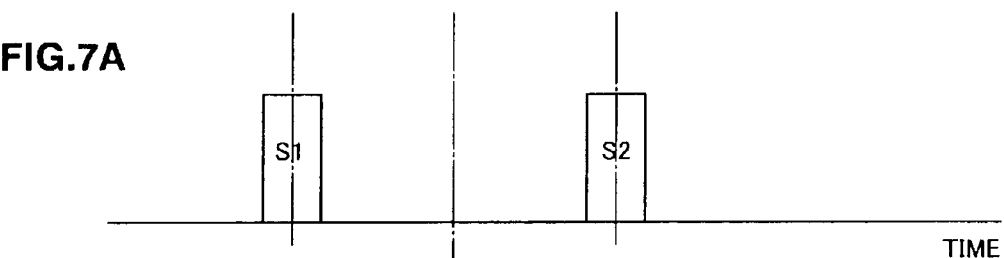
FIG. 7 is a schematic diagram when Apparatus A sends a pilot signal S1 to a power line and Apparatus B sends the pilot signal S2 to the power line.
Figure 7B:
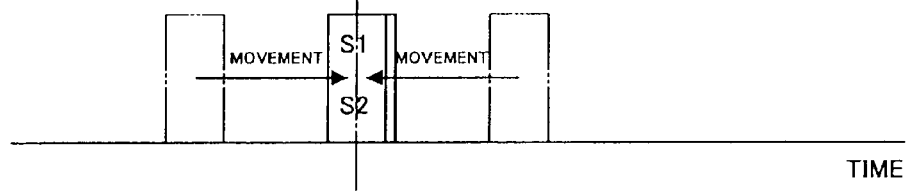

Each apparatus in the power line communication system 500 detects during operation pilot signals of other apparatuses from signals received via the coupler 204. FIG. 7A shows a case in which Apparatus A transmits the pilot signal S1 to the power line 100 and Apparatus B transmits the pilot signal S2 to the power line 100. In this case, as shown in FIG. 7B, Apparatus A detects the pilot signal S2 of Apparatus B and moves transmission timing of the pilot signal S1 of Apparatus A so that the transmission timing matches that of the pilot signal S2. On the other hand, Apparatus B detects the pilot signal S1 of Apparatus A and moves transmission timing of the pilot signal S2 of Apparatus B so that the transmission timing matches that of the pilot signal S1. By repeating this operation, timing of the pilot signals of Apparatus A and Apparatus B can be matched.

Since it is necessary for Apparatus A and Apparatus B to detect the pilot signal of the other apparatus during communication, Apparatus A and Apparatus B sometimes stop transmission of the pilot signal to detect the pilot signal output by the other apparatus. If Apparatus B stops transmission of the pilot signal S2 in timing while Apparatus A stops transmission of the pilot signal S1, it may be impossible for each of Apparatus A and Apparatus B to detect the pilot signal of the other apparatus. Thus, timing when transmission of the pilot signal is stopped to detect the pilot signal of the other apparatus should have a certain degree of randomness. Moreover, an occurrence of detection omission can reliably be prevented by detecting the pilot signal a plurality of times. Further, detection precision can be improved by calculating an average value of the position of the pilot signal by detecting the pilot signal the plurality of times.

If, in the case of FIG. 7, more apparatuses are already communicating, Apparatus A detects pilot signals of a plurality of apparatuses and outputs the pilot signal of the own apparatus toward the center of the range of variations of the positions of pilot signals (pilot signals of the own apparatus). Other apparatuses perform the same processing. By repeating the processing, the positions of pilot signals of all apparatuses can be caused to match.

If, also in the case of FIG. 6, a plurality of apparatuses is already communicating before Apparatus A enters communication, Apparatus A detects pilot signals of the plurality of apparatuses and outputs the pilot signal toward the center of the range of variations thereof. Then, each apparatus detects pilot signals of other apparatuses and outputs the pilot signal of the own apparatus toward the center of the range of variations of the position of pilot signals (pilot signals of the own apparatus). If the processing is repeated, the positions of pilot signals of all apparatuses will match.

FIG. 8 shows a case in which Apparatus A and Apparatus B output signals to the power line 100 and then, Apparatus C starts communication. First, the pilot signal S1 and the pilot signal S2 are being transmitted in the state of FIG. 8A, but positions thereof are apart and thus, it is difficult for Apparatus A and Apparatus B to recognize the pilot signal of the other apparatus.

Figure 8A:
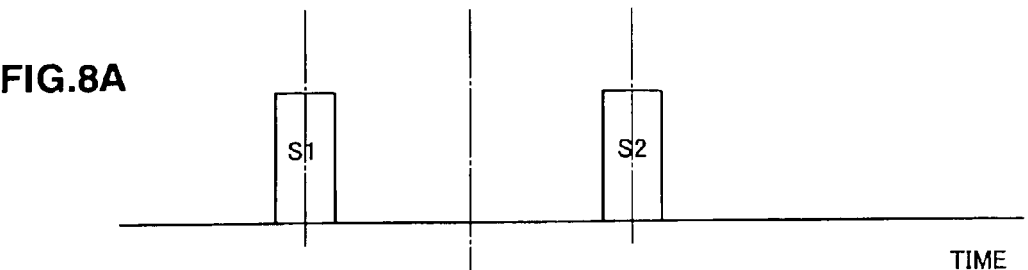
FIG. 8 is a schematic diagram when Apparatus A and Apparatus B output signals to the power line and then Apparatus C starts communication.
Figure 8B:
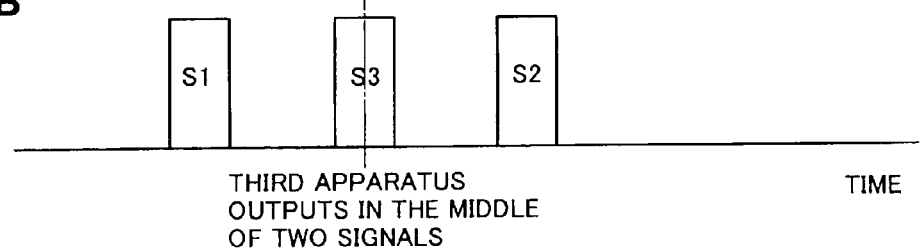

Next, in FIG. 8B, Apparatus C outputs a signal to the power line 100 to start communication. The apparatus that newly enters communication outputs the pilot signal of the own apparatus toward the center of variations of pilot signals of apparatuses that are already communicating. In the example in FIG. 8B, Apparatus C detects the positions of the pilot signal S1 and the pilot signal S2 and outputs a pilot signal S3 of the own apparatus toward the center of the pilot signals S1 and S2. Accordingly, Apparatus A and Apparatus B can detect the pilot signal S3 that is output in timing relatively close to the pilot signal of the own apparatus.

Figure 8C:
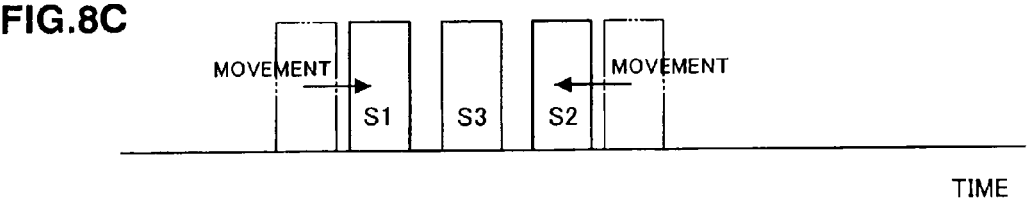
Figure 8D:
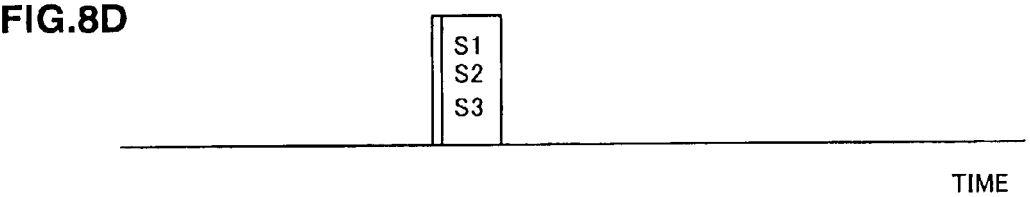

Then, in FIG. 8C, Apparatus A that detects the pilot signal S3 moves the pilot signal S1 of the own apparatus so that the pilot signal S1 moves closer to the pilot signal S3 of Apparatus C. Also, Apparatus B that detects the pilot signal S3 moves the pilot signal S2 of the own apparatus so that the pilot signal S2 moves closer to the pilot signal S3 of Apparatus C. On the other hand, while Apparatus C moves the pilot signal S3 toward the center of variations of the detected pilot signal S1 and pilot signal S2, the position of the pilot signal S3 hardly changes because the pilot signal S3 is already output toward the center of the pilot signals S1 and S2.

Then, by repeating the operation in FIG. 8C, the pilot signal S1 and the pilot signal S2 move closer to the pilot signal S3 and in the end, the positions of the pilot signals S1, S2, and S3 will match.

Thus, even if the positions of the pilot signal S1 and the pilot signal S2 are apart and it is difficult for Apparatus A and Apparatus B to recognize the pilot signal of the other apparatus, the pilot signal S3 positioned therebetween can be used to cause the positions of all the pilot signals S1, S2, and S3 to match.

If, in the case of FIG. 8, more apparatuses are already communicating when Apparatus C enters communication, Apparatus C detects pilot signals of a plurality of apparatuses and outputs a pilot signal toward the center of the range of variations thereof. Then, each apparatus detects pilot signals of other apparatuses and outputs the pilot signal of the own apparatus toward the center of the range of variations of the position of pilot signals (pilot signals of the own apparatus). By repeating the processing, the positions of pilot signals of all apparatuses can be caused to match.

Figure 9:
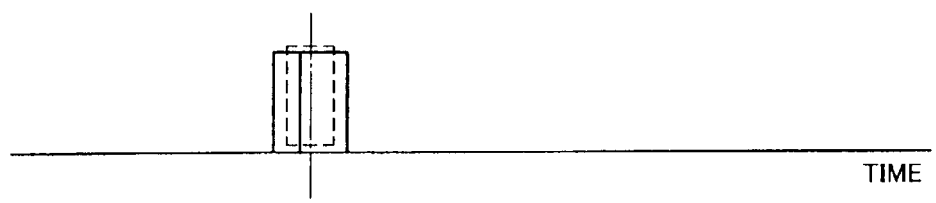
FIG. 9 is a schematic diagram when pilot signals of a plurality of apparatuses overlap.

FIG. 9 shows a case in which pilot signals of a plurality of apparatuses overlap. In this case, an apparatus that newly enters communication outputs a pilot signal of the own apparatus toward the center position in the timing distribution of pilot signals detected in an overlapped state. Each apparatus already communicating moves the pilot signal of the own apparatus toward the center of time distribution of all pilot signals (including the pilot signal of the own apparatus). Accordingly, the positions of all the pilot signals can be matched.

An error may occur in timing measurement of pilot signals of other apparatuses and the measurement error is set as Esig. If, on the other hand, a reference timing signal is generated from a zero-cross point of the home AC power supply, as described above, an error Eref occurs in the reference timing signal arising from a difference between positive and negative waveforms, circuit responses, household appliance noise and the like. Since timing measurement of pilot signals is high-frequency detection, the error Esig is relatively small and the relation Esig<Eref holds.

Figure 10:
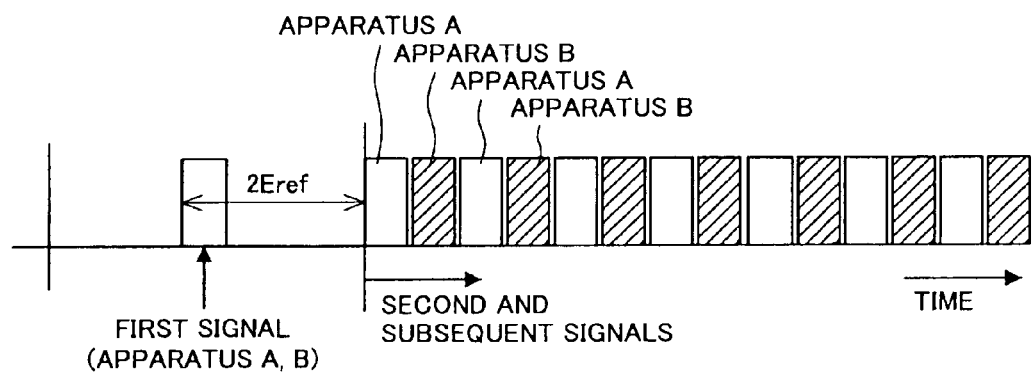
FIG. 10 is a schematic diagram showing a state in which transmission timing of first signals is matched when Apparatus A and Apparatus B transmit signals.
Figure 15:
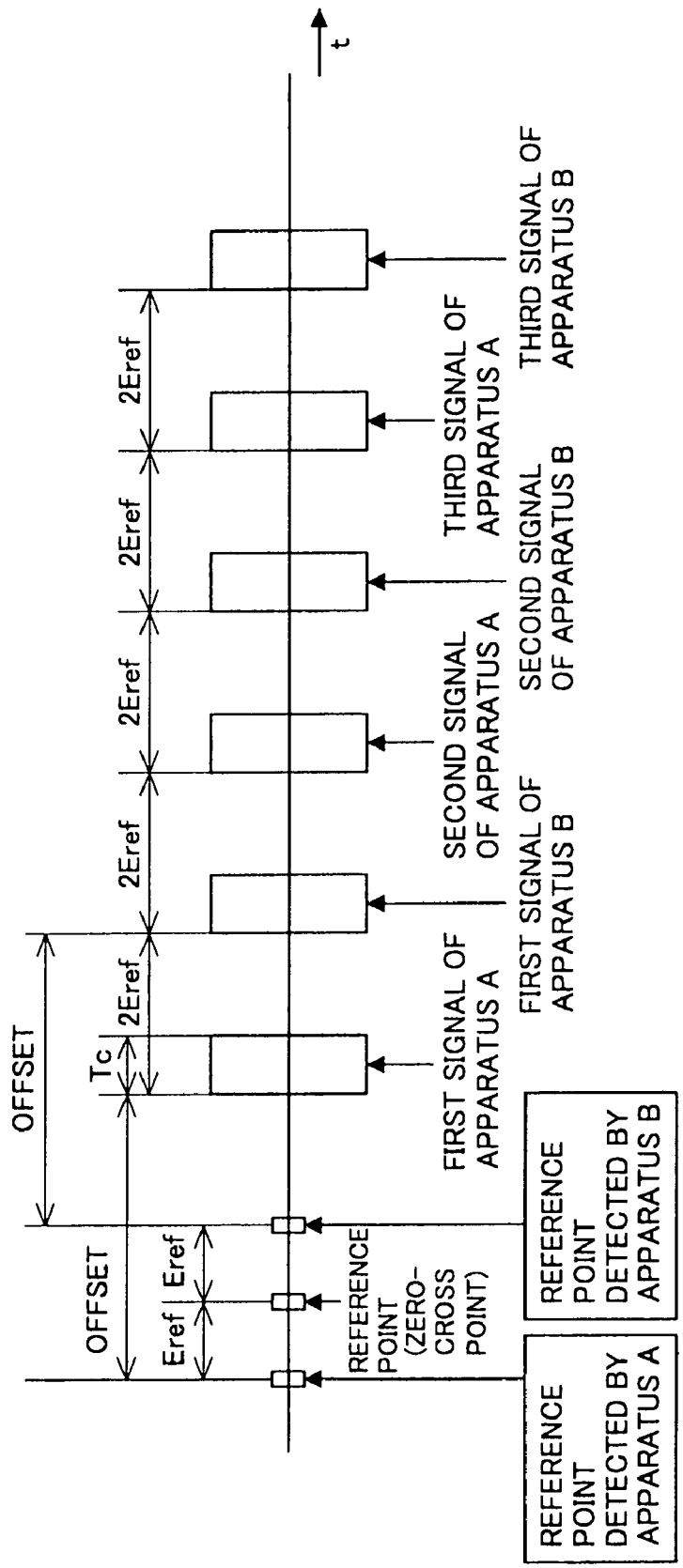
FIG. 15 is a schematic diagram showing intervals of signals in consideration of the margin.

FIG. 10 shows a state in which transmission timing of first signals is matched when Apparatus A and Apparatus B transmit signals. In this state, there is no shift of signals of Apparatus A and Apparatus B due to a detection error of the reference timing signal. Therefore, as shown in FIG. 10, the second and subsequent signals can alternately arranged in such a way that these signals do not interfere with each other. In this case, the measurement error Esig is enough as an interval between adjacent signals and when compared with FIG. 15, the interval between adjacent signals can be minimized. Therefore, transmission efficiency can significantly be improved. In a system according to the present embodiment, the interval of data signals transmitted by each apparatus can be minimized by synchronizing communication apparatuses that do not communicate with each other by transmission timing of pilot signals being matched so that transmission efficiency can be enhanced.

Whether transmission timing of pilot signals matches is determined in each apparatus by whether pilot signals of all detected other apparatuses and the pilot signal of the own apparatus fall within predetermined time limits. The predetermined time can be determined based on the measurement error Esig. If each apparatus determines that transmission timing of pilot signals falls within limits that is difficult to further narrow down, each apparatus determines that transmission timing of pilot signals matches and continues to output the pilot signal in the timing. In this state, transmission timing of pilot signals matches among apparatuses already communicating. Therefore, if there is an apparatus that will enter communication, only the apparatus that will enter communication needs to match the pilot signal thereof to transmission timing of pilot signals of apparatuses already communicating and there is no need for apparatuses already communicating to move the transmission timing of pilot signals.

Figure 11:
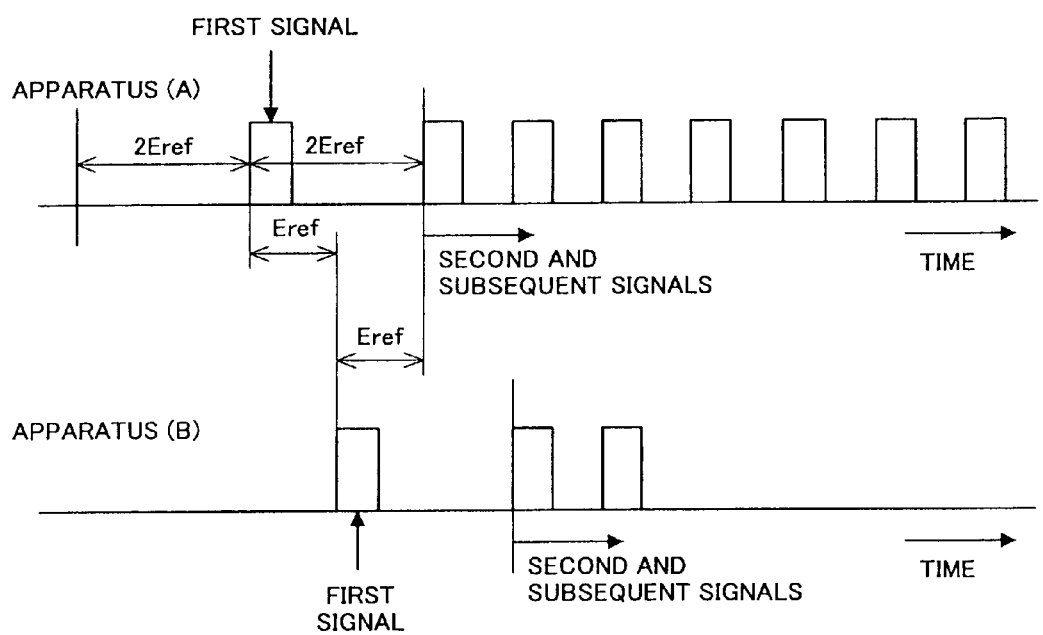
FIG. 11 is a schematic diagram when the first signal of Apparatus A leads that of Apparatus B by a detection error Eref of a zero-cross point.

If, as shown in FIG. 11, the first signal of Apparatus A leads that of Apparatus B by Eref, Apparatus B detects the pilot signal of the other apparatus within the range of ±2×Eref of the pilot signal thereof. Thus, Apparatus B may detect the second signal or subsequent one of Apparatus A as the first signal. Even in such a case, however, Apparatus B can also detect the first signal of Apparatus A and the pilot signal thereof is positioned between the pilot signal and the second signal of Apparatus A and thus, does not move the pilot signal thereof. On the other hand, since Apparatus A detects the first signal of Apparatus B, Apparatus A moves the pilot signal thereof toward the pilot signal of Apparatus B. Therefore, by repeating this operation, the positions of pilot signals of Apparatus A and Apparatus B can be matched in the end.

Therefore, while it is necessary to provide a time interval of 4Eref between bits of the first and second signals according to a technique in related art, the positions of the first signals can be caused to match in the present embodiment by securing ½ thereof, that is, 2Eref so that transmission efficiency can be enhanced. Moreover, only the first signal is used to achieve synchronization and thus, there is no need to have a margin for the second and subsequent signals so that transmission efficiency can significantly be improved. Incidentally, the error Esig arises when measuring the position of pilot signal carriers and therefore, it is preferable to provide an interval between adjacent signals for a margin of the error Esig in the second and subsequent signals.

If the signal to be transmitted is an OFDM signal, differences between the first signal and the second and subsequent signals can be identified by a technique of, for example, changing the phase vector of carriers. In this case, there is no need for a margin of the interval between the first and second signals so that transmission efficiency can further be improved.

Next, processing in the modem 200 in the present embodiment will be described based on the flow chart in FIG. 12. First, at step S10, whether the own apparatus newly enters communication, that is, whether to transmit a signal to the power line 100 is determined. Then, if communication is newly entered, go to step S12. At step S12, pilot signals of other apparatuses already operating are detected and the center position in the range where pilot signals are present is detected. In this case, the intermediate position of the maximum value and minimum value of the center position is detected by detecting pilot signals a plurality of times.

At step S10, on the other hand, if the own apparatus is already communicating, go to step S14. At step S14, communication of the own apparatus is sometimes stopped to detect pilot signals of other apparatuses. In this case, pilot signals are detected a plurality of times and the center of variations including the position of the pilot signal of the own apparatus is detected a plurality of times to detect the intermediate position of the maximum value and minimum value of detected values.

After steps S12 and S14, go to step S16. At step S16, the pilot signal of the own apparatus is output in the intermediate position of the maximum value and minimum value calculated at steps S12 and S14.

At next step S18, it is determined whether the detected pilot signals of all apparatuses fall within predetermined time limits. If the detected pilot signals of all apparatuses fall within predetermined time limits, processing is terminated. If, on the other hand, at least one detected pilot signal does not fall within specified time limits, processing returns to step S12 to perform processing at step S12 and thereafter.

Figure 12:
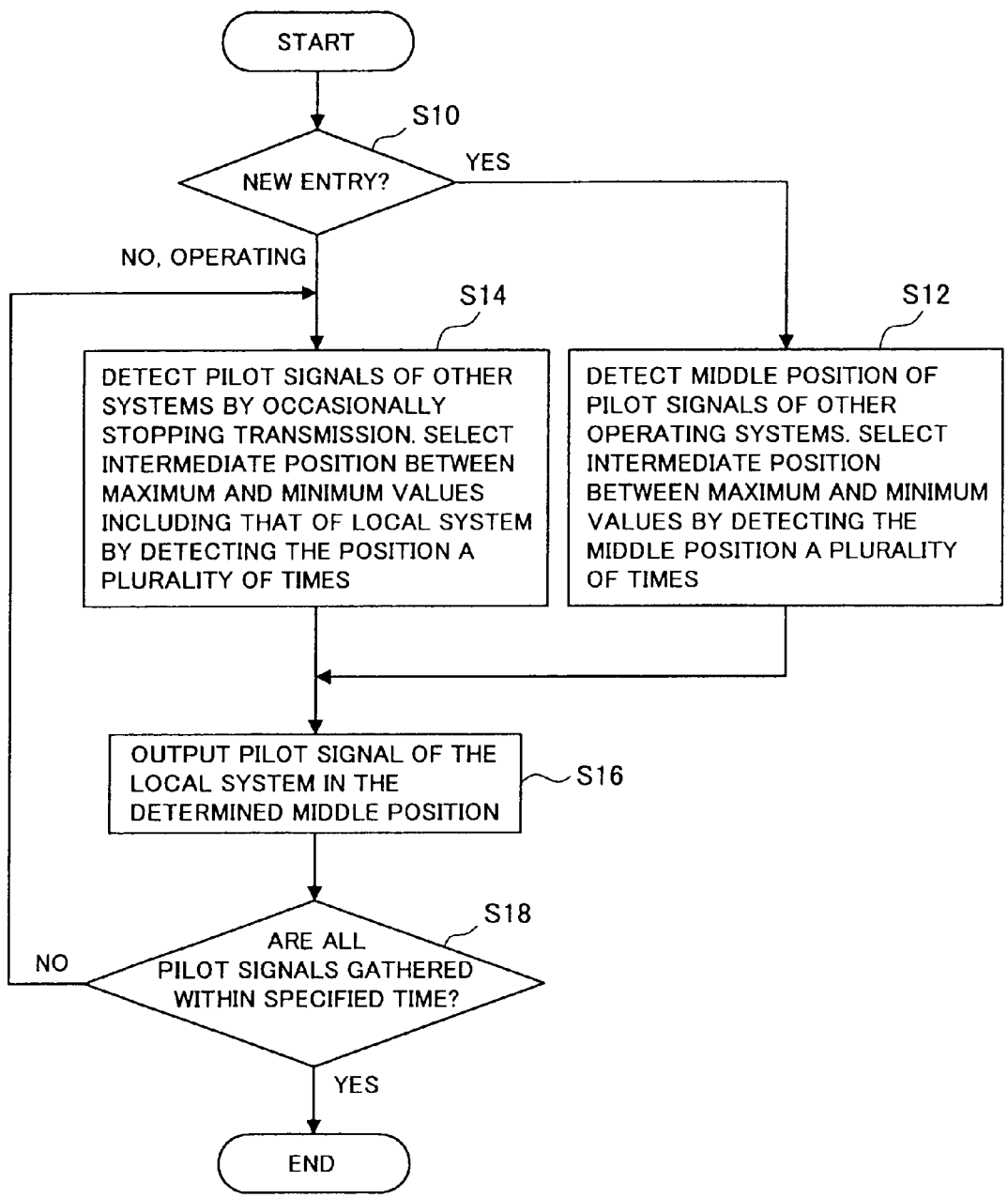
FIG. 12 is a flow chart showing processing by the modem in a present embodiment.
Figure 13:
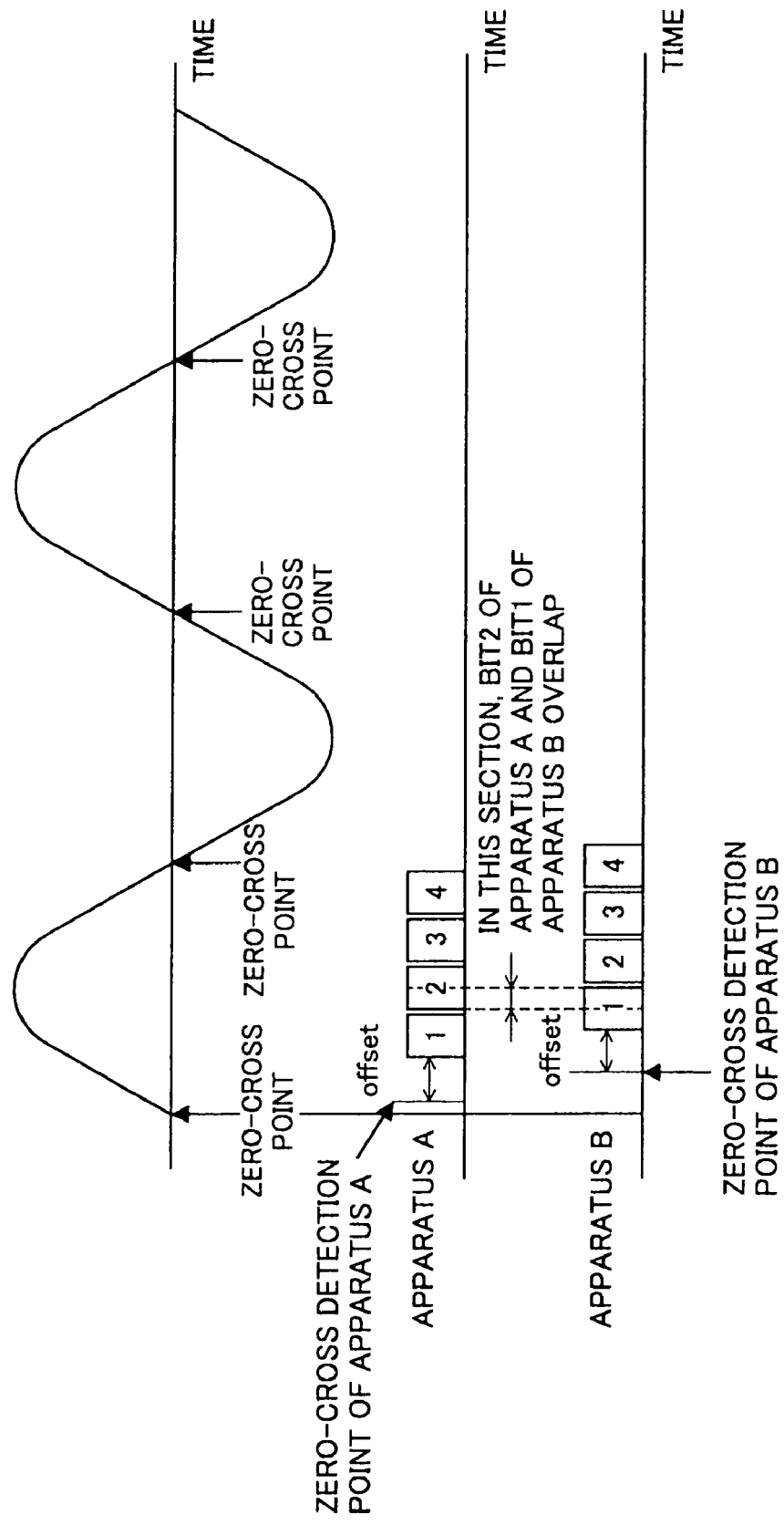
FIG. 13 is a schematic diagram showing how transmission signals are transmitted by two apparatuses of Apparatus A and Apparatus B based on zero-cross points of an AC power supply.
Figure 14:
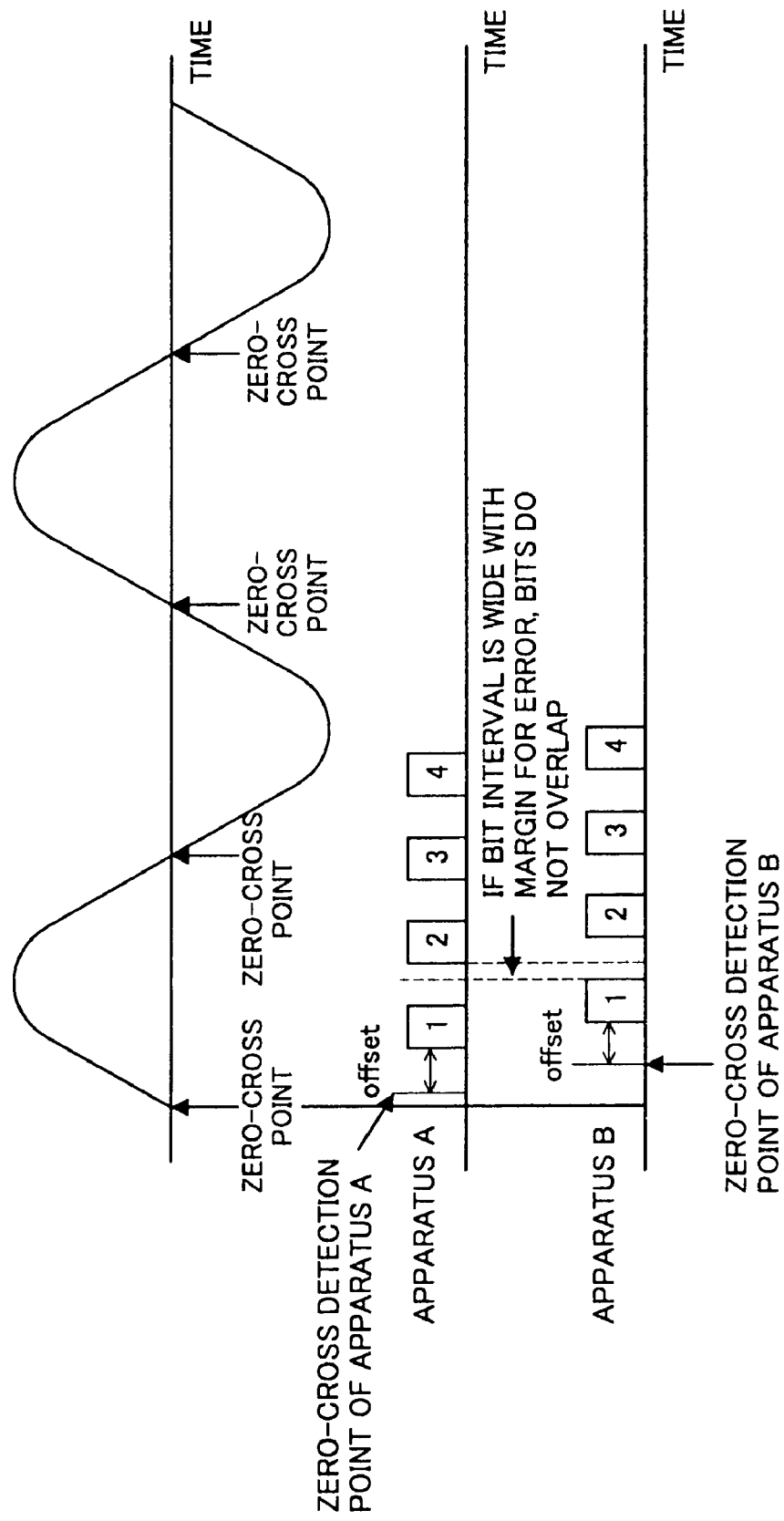
FIG. 14 is a schematic diagram showing a state in which an interval is provided between signals by forming a slot of a fixed time as a margin containing an assumed error of zero-cross detection in each apparatus.

According to processing in FIG. 12, since all apparatuses participating in communication adjust the position of the pilot signal of the own apparatus based on the positions of pilot signals of other apparatuses, pilot signals of all operating apparatuses can be caused to fall within specified time limits. Therefore, an error with respect to the reference timing signal can be corrected so that transmission efficiency can be improved.

According to the present embodiment, as described above, pilot signals of all apparatuses can be concentrated on one point by using an algorithm by which each apparatus moves the pilot signal of the own apparatus toward the center of variations of the detected pilot signals of other apparatuses. Therefore, there is no need to consider a detection error for bits of data signals subsequent to the pilot signal and a large quantity of signals can be transmitted within a specified time so that transmission efficiency can significantly be enhanced.

It should be understood by those skilled in the art that various modifications, combinations, sub-combinations and alterations may occur depending on design requirements and other factors insofar as they are within the scope of the appended claims or the equivalents thereof.

What is claimed is:
1. A communication apparatus, comprising:
a power supply unit that acquires a voltage from a transmission line connected from outside;
a transmission control unit that transmits a data signal and a pilot signal placed at a start of the data signal to the transmission line;
a pilot signal detection unit that detects pilot signals transmitted to the transmission line by other apparatuses; and
a timing adjustment unit that adjusts transmission timing of the pilot signal of the communication apparatus in accordance with transmission timing of the pilot signals transmitted by the other apparatuses,
when the pilot signal detection unit detects the pilot signals transmitted by a plurality of the other apparatuses, the timing adjustment unit outputs the pilot signal of the communication apparatus toward a center of variations of the transmission timing of a plurality of the detected pilot signals, and
when the pilot signal detection unit detects the plurality of pilot signals when newly starting communication, the timing adjustment unit outputs the pilot signal of the communication apparatus toward the center of variations of the transmission timing of the plurality of the detected pilot signals.

2. A communication apparatus, comprising:
a power supply unit that acquires a voltage from a transmission line connected from outside;
a transmission control unit that transmits a data signal and a pilot signal placed at a start of the data signal to the transmission line;
a pilot signal detection unit that detects pilot signals transmitted to the transmission line by other apparatuses; and
a timing adjustment unit that adjusts transmission timing of the pilot signal of the communication apparatus in accordance with transmission timing of the pilot signals transmitted by the other apparatuses,
when the pilot signal detection unit detects the pilot signals transmitted by a plurality of the other apparatuses, the timing adjustment unit outputs the pilot signal of the communication apparatus toward a center of variations of the transmission timing of a plurality of the detected pilot signals, and
when the pilot signal detection unit detects the plurality of pilot signals during communication, the timing adjustment unit moves the transmission timing of the pilot signal of the communication apparatus toward the center of overall variations including the transmission timing of the plurality of detected pilot signals and the transmission timing of the pilot signal of the communication apparatus.

3. A transmission line communication chip, comprising:
a transmission control unit that transmits a pilot signal and signals subsequent to the pilot signal to a transmission line;
a pilot signal detection unit that detects pilot signals transmitted to the transmission line by other apparatuses; and
a timing adjustment unit that adjusts transmission timing of the pilot signal of its own apparatus in accordance with transmission timing of the pilot signals of the other apparatuses,
when the pilot signal detection unit detects the pilot signals transmitted by the other apparatuses when newly starting communication, the timing adjustment unit outputs the pilot signal of the own apparatus toward the center of variations of the transmission timing of the plurality of the detected pilot signals.

4. A communication method comprising the steps of:
detecting a plurality of pilot signals transmitted to a transmission line by other apparatuses;
acquiring a center of variations of transmission timing of the pilot signals; and
setting the transmission timing of a pilot signal of its own apparatus so that the transmission timing moves toward the center of the acquired variations and outputting the pilot signal of its own apparatus to the transmission line,
when the plurality of pilot signals transmitted by the other apparatuses are detected when newly starting communication, the setting step outputs the pilot signal of the own apparatus toward the center of variations of the transmission timing of the plurality of the detected pilot signals.

5. A transmission line communication chip, comprising:
a transmission control unit that transmits a pilot signal and signals subsequent to the pilot signal to a transmission line;
a pilot signal detection unit that detects a plurality of pilot signals transmitted to the transmission line by other apparatuses; and
a timing adjustment unit that adjusts transmission timing of the pilot signal of its own apparatus,
when the pilot signal detection unit detects the plurality of pilot signals during communication, the timing adjustment unit moves the transmission timing of the pilot signal of the own apparatus toward a center of overall variations of transmission timings including a transmission timing of the plurality of detected pilot signals and the transmission timing of the pilot signal of the own apparatus.

6. A communication method comprising the steps of:
detecting a plurality of pilot signals transmitted to a transmission line by other apparatuses; and
setting a transmission timing of a pilot signal of its own apparatus and outputting the pilot signal of its own apparatus to the transmission line,
when the plurality of pilot signals are detected during communication, the setting step moves the transmission timing of the pilot signal of the own apparatus toward a center of overall variations of transmission timings including a transmission timing or timings of the plurality of detected pilot signals and the transmission timing of the pilot signal of the own apparatus.

* * * * *